Patented May 19, 1953

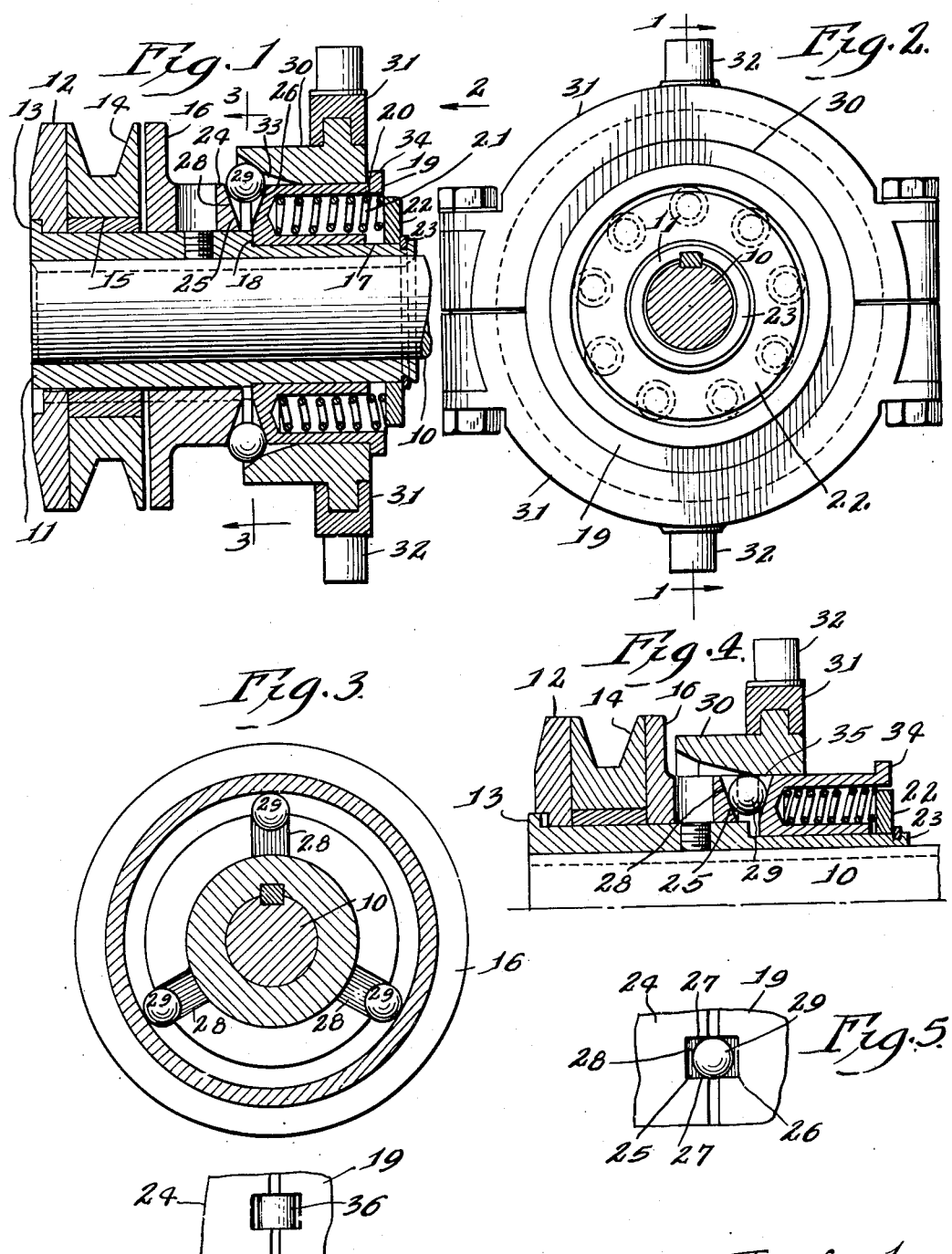

2,639,015

UNITED STATES PATENT OFFICE 2,639,015

CAM OPERATED CLUTCH WITH SPRING LOADING

Lloyd J. Wolf, Racine, Wis., assignor to Twin Disc Clutch Company, Racine, Wis., a corporation of Wisconsin Application May 14, 1949, Serial No. 93,358

9 Claims. (Cl. 192—93)

1

My invention relates to clutches and more particularly to an arrangement which is characterized by compactness, simplicity of structure and smoothness of action.

One object of the invention is to devise a clutch of the character indicated in which the clamping members are spring loaded during engagement, thereby providing for self-adjustment of the wearing faces, and in which during disengagement the actuating mechanism is free of spring pressure.

A further object is to provide a clutch as above in which the parts that transmit the spring pressure to the clamping members are not positively connected to the clutch structure, as by a pivot pin or comparable element, and are therefore conditioned to freely assume their various positions within reasonable limits.

A further object is to provide a clutch having the noted characteristics which is held in engaged and disengaged positions without requiring the use of a toggle mechanism.

These and further objects of the invention will be set forth in the following specification, reference being had to the following drawing, and the novel means by which said objects are effectuated will be definitely pointed out in the claims.

In the drawing:

Fig. 1 is a sectional elevation of the clutch in release position taken along the line 1—1 in Fig. 2.

Fig. 2 is an end view looking in the direction of the arrow 2 in Fig. 1.

Fig. 3 is a section along the line 3—3 in Fig. 1.

Fig. 4 is a fragmentary section similar to Fig. 1, but showing the clutch in engagement.

Fig. 5 is a plan detail showing the relation of the actuating balls to the adjacent parts of the clutch.

Fig. 6 is a view similar to Fig. 5, but showing a roller substituted for the ball.

Referring to the drawing, the numeral 10 designates a shaft that is keyed to a hub 11 which, by way of example, will be regarded as the driven member. An abutment plate 12 is connected to the left end of the hub for rotation therewith, or may, if desired, be formed integrally with the hub and is restrained against axial movement towards the left by a shoulder 13 on the hub. The plate 12 frictionally engages one side of a belt sheave 14 that is journaled on a bearing 15, also keyed to the hub 11, and the opposite side of the sheave is arranged for frictional engagement with a clamping plate

2

16 that is slidable on the hub and is keyed for rotation therewith. The sheave 14 serves as the driving member of the clutch and is representative of any element employed for this purpose, whether of the single or multiple plate type and regardless of how connected to the power source.

To the right of the clamping plate 16, the hub 11 is reduced in diameter as at 17 to thereby form an annular shoulder 18 and slidable on the reduced portion 17 is a holder ring 19 having a plurality of equispaced pockets 20 extending part way through the ring from the right side thereof. A helical spring 21 is positioned in each pocket 20 with its opposite ends respectively abutting the end of the pocket and a retaining ring 22 that encircles the hub and is held against movement towards the right by a split ring 23 recessed in the hub. When assembled, the springs 21 are subjected to an initial compression sufficient to maintain the ring 19 in contact with the shoulder 18 which is the position occupied by the ring during release periods of the clutch.

The shoulder 18 is located so that the opposed end faces of the ring 19 and a sleeve 24 forming part of and coaxial with the clamping plate 16 are slightly spaced from each other. The sleeve end face is provided with a plurality of circumferentially spaced recesses 25 and the ring end face outwardly of the shoulder 18 includes a corresponding number of identically shaped recesses 26. The parts are arranged so that the respective recesses face each other in cooperative pairs.

Considering a recess 25, which is representative of all the recesses and referring to Figs. 1 and 5, it is defined by a pair of parallel surfaces 27—27 connected by a surface 28 inclined so that the depth of the recess axially of the clutch gradually increases outwardly from the hub 11. Hence, as indicated in Fig. 1, the recesses forming each cooperative pair are characterized by a wedge-like relation and nested between each pair of recesses 25 and 26 is a ball 29. The balls are retained in operative relation to the recesses by an actuating collar 30 which encircles and is slidable on the holder ring 19 and endwise shifting of the collar is accomplished by bolted together ring segments 31—31 which are secured to the collar and carry trunnions 32—32 for engagement by a shifting fork (not shown), all in the manner well known in the clutch art. A part of the bore of the collar 30 is beveled outwardly as at 33 on the end adjacent the balls 29 for purposes presently explained.

In Fig. 1, the clutch is shown in release position wherein the collar 30 is retracted towards the right against a stop flange 34 provided on the holder ring 19 which abuts the shoulder 18 under the thrust of the springs 21, the balls 29 rest in the recesses 25 and 26 free of pressure by the ring 19 and are retained in their positions by the beveled bore portion 33 of the collar 30, and the clamping plate 16 stands clear of the sheave 14.

To engage the clutch, the collar 30 is shifted from the position shown in Fig. 1 to that indicated in Fig. 4, thus forcing the balls 29 inwardly of the recesses 25 and 26 and moving the clamping plate 16 and ring 19 in opposite directions. The beveled bore portion 33 insures an easy and smooth, inward actuation of the balls to thereby shift the clamping plate 16 into gripping relation with the sheave 14 against the abutment ring 12, while the movement of the holder ring 19 further compresses the springs 21 whose thrust is transmitted through the balls to the clamping plate 16, thus providing a spring loaded clutch. As indicated in Fig. 4, the radial thrust of the balls 29 is exerted normally against the straight bore portion 35 of the collar 30 so that there is no resultant tending to shift the collar 30 from its engaged position and the clutch is locked in this position.

The clutch is released by moving the collar 30 to the position shown in Fig. 1 in which the several parts occupy the positions and relations already described. An important feature of the clutch is that, in the release position, none of the actuating mechanism is subjected to spring loading.

The clutch is self-adjusting, operates smoothly with a minimum of effort, is automatically locked in the engaged and disengaged positions, since, in the latter, the balls 29 prevent inadvertent movement of the collar 30 in an engaging direction, and eliminates any necessity for an adjusting ring or any form of adjusting mechanism. Variable loadings may be easily obtained by changing the springs as desired.

For the purpose of reducing the so-called Hertz loading on the balls, i. e., the tendency of the ball surfaces to flatten at the points of loading, it may be desirable to employ rollers instead of the balls, as indicated by the numeral 36 in Fig. 6. Each roller is positioned with its axis lying in a plane transverse of the clutch axis.

I claim:

1. In a clutch, the combination of a friction plate, a clamping plate arranged to engage the friction plate, a hub to which the clamping plate is connected for rotation therewith and axial movement relative thereto, a ring slidable on the hub in coaxial relation to the clamping plate, spring means urging the ring towards the clamping plate, wedge-acting means movable inwardly of the hub for moving the clamping plate in one direction to engage the friction plate and for moving the ring in the opposite and further loading direction against the spring means, and means limiting the movement of the ring towards the clamping plate.

2. In a clutch, the combination of a friction plate, a clamping plate arranged to engage the friction plate, a hub to which the clamping plate is connected for rotation therewith and axial movement relative thereto, a ring slidable on the hub in coaxial relation to the clamping plate, spring means urging the ring towards the clamping plate, a plurality of balls spaced around the hub and engageable with the adjacent ends of the clamping plate and ring, means for moving the balls inwardly of the hub to thereby move the clamping plate and ring in opposite directions, the clamping plate engaging the friction plate and the ring under the impulse of the spring means exerting pressure through the balls on the clamping plate, the springs means being additionally loaded by the movement of the ring in said opposite direction, and means limiting the movement of the ring towards the clamping plate.

3. In a clutch, the combination of a friction plate, a clamping plate arranged to engage the friction plate, a hub to which the clamping plate is connected for rotation therewith and axial movement relative thereto, a ring slidable on the hub in coaxial relation to the clamping plate, spring means urging the ring towards the clamping plate, a plurality of balls spaced around the hub and engageable with the adjacent ends of the clamping plate and ring, means slidable on the ring for moving the balls inwardly of the hub to thereby move the clamping plate and ring in opposite directions, the clamping plate engaging the friction plate and the ring under the impulse of the spring means exerting pressure through the balls on the clamping plate, the spring means being additionally loaded by the movement of the ring in said opposite direction, and means limiting the movement of the ring towards the clamping plate.

4. In a clutch, the combination of a friction plate, a clamping plate arranged to engage the friction plate, a hub to which the clamping plate is connected for rotation therewith and axial movement relative thereto, a ring slidable on the hub in coaxial relation to the clamping plate, spring means urging the ring towards the clamping plate, wedge-acting means movable inwardly and outwardly of the hub to respectively further separate the clamping plate and ring to engage the clutch and to enable the clamping plate and spring loaded means to approach each other to release the clutch, the ring additionally loading the spring means during said separating movement, and means limiting the movement of the ring towards the clamping plate.

5. In a clutch, the combination of a friction plate, a hub, a clamping plate and a ring slidable on the hub in adjacent relation, springs acting against and tending to move the ring towards the clamping plate, wedge related surfaces on the opposed ends of the clamping plate and ring, means engageable with the surfaces to move the clamping plate and ring in opposite directions to respectively engage the clamping and friction plates and to further load the springs, and means limiting the movement of the ring towards the clamping plate.

6. In a clutch, the combination of a friction plate, a hub, a clamping plate and a ring slidable on the hub in adjacent relation, springs acting against and tending to move the ring towards the clamping plate, wedge related surfaces on the opposed ends of the clamping plate and ring, a plurality of balls engageable with the surfaces to move the clamping plate and ring in opposite directions to respectively engage the clamping and friction plates and to further load the springs, and means limiting the movement of the ring towards the clamping plate.

7. In a clutch, the combination of a friction plate, a hub, a clamping plate and a ring slidable on the hub in adjacent relation, springs acting against and tending to move the ring towards the clamping plate, a plurality of recesses spaced around the opposed end faces of the clamping plate and ring, the respective recesses being arranged in cooperating wedge related pairs, a ball engaging each recess pair, means for moving the balls inwardly of the hub to shift the clamping plate and ring in opposite directions to respectively engage the clamping and friction plates and to further load the springs, and means limiting the movement of the ring towards the clamping plate.

8. In a clutch, the combination of a friction plate, a hub, a clamping plate and a ring slidable on the hub in adjacent relation, springs acting against and tending to move the ring towards the clamping plate, a plurality of recesses spaced around the opposed end faces of the clamping plate and ring, the respective recesses being arranged in cooperating wedge related pairs, a ball engaging each recess pair, a collar slidable on the ring for moving the balls inwardly of the hub to shift the clamping plate and ring in opposite directions to respectively engage the clamping and friction plates and to further load the springs, and means limiting the movement of the ring towards the clamping plate.

9. In a clutch, the combination of a friction plate, a hub, a clamping plate and a ring slidable on the hub in adjacent relation, the ring having pockets spaced therearound and opening away from the clamping plate, a retaining ring carried by the hub adjacent the open ends of the pockets, springs in the pockets abutting the ends thereof and the retaining ring and tending to move the first named ring towards the clamping plate, wedge related surfaces on the opposed ends of the clamping plate and first named ring, means engageable with the surfaces to move the clamping plate and first named ring in opposite directions to respectively engage the clamping and friction plates and to further load the springs, and means limiting the movement of the first named ring towards the clamping plate.

LLOYD J. WOLF.

References Cited in the file of this patent

UNITED STATES PATENTS

| Number | Name | Date |
|---|---|---|
| 614,951 | Hoffman | Nov. 29, 1898 |
| 1,163,386 | White | Dec. 7, 1915 |
| 1,306,302 | Cooper | June 10, 1919 |
| 1,720,766 | Spahr | July 16, 1929 |
| 2,044,487 | Wemp | June 16, 1936 |
| 2,367,390 | Firth et al. | Jan. 16, 1945 |
| 2,401,864 | Gerst | June 11, 1946 |
| 2,407,060 | Croft | Sept. 3, 1946 |